Patented Apr. 6, 1926.

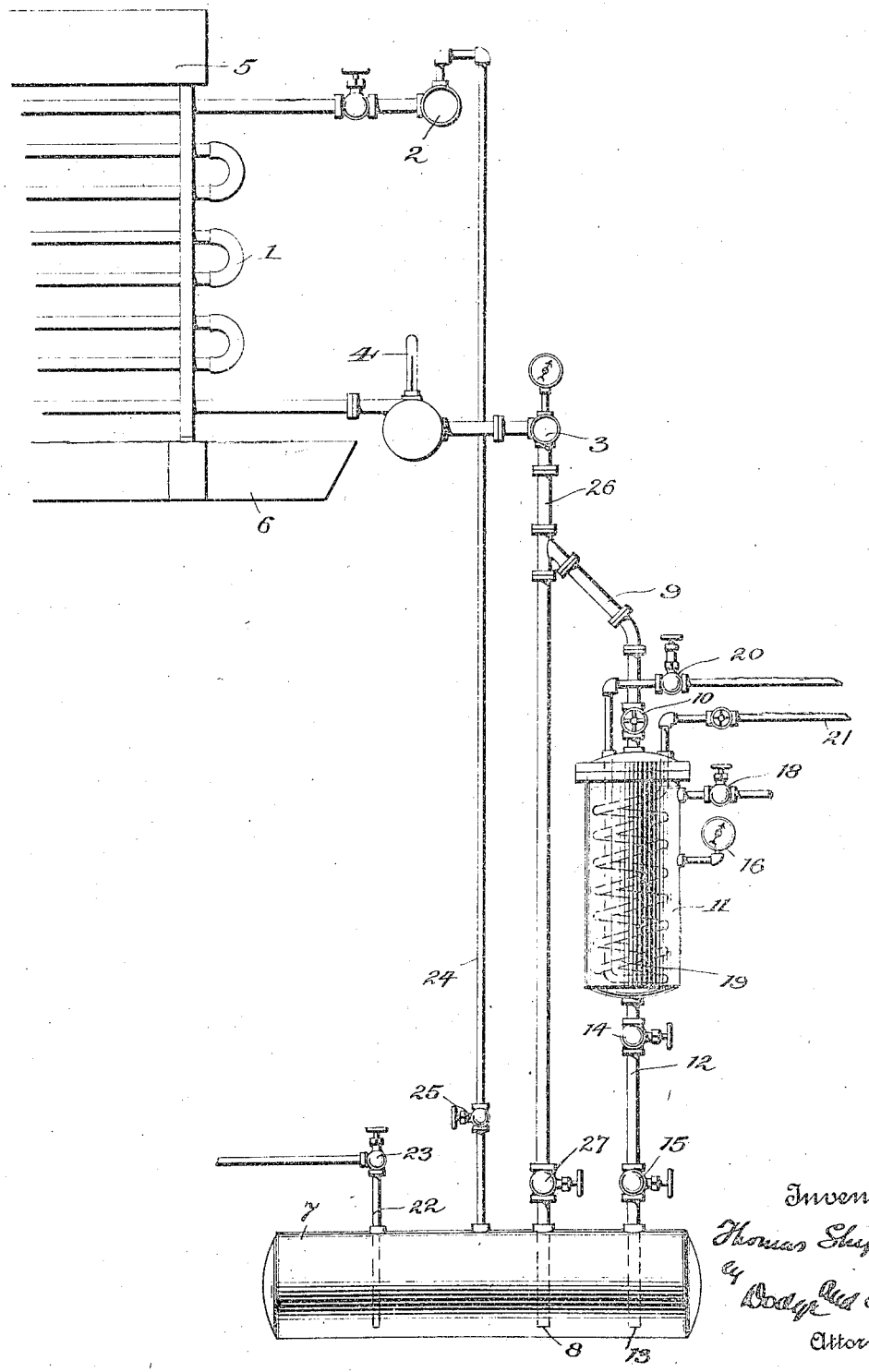

1,579,405

UNITED STATES PATENT OFFICE.

THOMAS SHIPLEY, OF YORK, PENNSYLVANIA.

APPARATUS FOR PURGING REFRIGERATING SYSTEMS.

Application filed October 18, 1924. Serial No. 744,469.

*To all whom it may concern:*

Be it known that I, THOMAS SHIPLEY, a citizen of the United States, residing at York, in the county of York and State of Pennsylvania, have invented certain new and useful Improvements in Apparatus for Purging Refrigerating Systems, of which the following is a specification.

This invention relates to apparatus for removing foreign gases from refrigerating systems, and operates according to the method described and claimed in my application Ser. No. 691,057, filed February 6, 1924, since issued as Patent 1,525,006. It is a modification of the apparatus described and claimed in a co-pending application Ser. No. 691,058, filed February 6, 1924, since issued as Patent 1,525,007, and is partly directed to certain features described, but not claimed, in a prior application Ser. No. 717,072, filed May 31, 1924.

In the prior applications above identified, there are disclosed a method and certain specific forms of apparatus for removing foreign gases, such as air, gases generated by the effect of heat on lubricating oil, and the like, from the refrigerant, such as anhydrous ammonia, used in refrigerating systems. The prior inventions were based on the fact, not theretofore generally understood, that such foreign gases were heavier than most gaseous refrigerants, particularly anhydrous ammonia, and hence can best be drawn from the bottom of the condenser.
Prior to my invention, the usual practice was to purge condensers from the top. It had been observed that the foreign gases accumulated in the condenser, and this was attributed to low specific gravity, although, in fact, it is caused by the existence of liquid seals which operate to trap the gas in the condenser, despite its tendency to flow therefrom.

According to my prior application, I interpose in the liquid line, between the condenser and the receiver, a purge drum and a bypass round said drum, the connections being provided with suitable valves, by means of which the purge drum may be cut into or out of the system, the bypass serving to maintain the system in operation when the purge drum is so cut out. In both of my prior apparatus applications, I show means for preventing the passage of foreign gases beyond the purge drum, said means comprising an oil separating trap. In certain cases it may not be desired to use such an oil trap, and the present application is designed to disclose and to claim specifically a construction in which the liquid in the main receiver is caused to perform this trap function.

In the earlier of my two co-pending apparatus applications I disclose a drain for the purge drum, by means of which the recovered liquid refrigerant is returned to the suction line. In the later of said two applications I disclose a construction by which the recovered refrigerant is discharged to the receiver. This feature of discharging to the receiver the recovered refrigerant is reserved in said prior application for the present application, in which it is claimed.

A preferred embodiment of the invention is disclosed in the accompanying drawing in diagrammatic elevation.

A portion of the condenser is shown at 1, the inlet or gas header, at 2, the outlet, or liquid header, at 3, and a thermometer inserted in a well in the liquid header at 4. This condenser is shown as of the familiar atmospheric type, and in practice would be equipped with the usual water-cooling sprays flowing in contact with the condenser coils from the overhead tank 5 to the pan or sump 6. The type of condenser is immaterial, provided it be so constructed or so operated that the liquid refrigerant is prevented from forming liquid seals or traps, either in the lower coils of the condenser or in the liquid header 3.

This is an important consideration, for the existence of such traps or seals serves to confine foreign gases to the condenser, despite their tendency to flow therefrom by gravity. Hence it is essential to the successful operation of my system that the existence, or at any rate the continued existence of such seals be precluded.
The liquid refrigerant line 26 leads directly downward through a valve 27 to the receiver 7, pipe 26 extending to a point 8 near the bottom of the receiver 7 so that it discharges at a substantial depth beneath the surface of the liquid refrigerant in the receiver. A branch 9 leads from the liquid line 26 through a valve 10 to the top of the purge drum 11. The bottom of the purge drum 11 is connected by a pipe 12 with the receiver 7, the pipe 12 extending to a point 13 near the bottom of the receiver 7 so that it, too, discharges at a substantial distance below the liquid level in the receiver 7. On the pipe 12 are two valves 14 and 15, which are spaced such a distance that the intervening volume in pipe 12 is sufficient to contain a substantial quantity of liquid refrigerant, and preferably the entire quantity which may be condensed in the purge drum 11 during a purging operation such as is hereinafter described.

The purge drum 11 is provided with a pressure gage 16 and with a valved vent 18. It is provided with a refrigerating coil 19 which is fed with refrigerant through an expansion valve 20, the expanded refrigerant passing from the coil to the suction line through a pipe 21. Liquid ammonia is drawn from the receiver 7 through a pipe line 22 equipped with a valve 23. The receiver pressure is equalized with the pressure in the gas header 2 by means of an equalizing pipe 24 which is provided with a cut out valve 25.

It is important that the pipes 26 and 12 discharge into the receiver 7 below the liquid level therein so that a liquid trap be formed to prevent the entrance of non-condensable gases into the receiver and assure their accumulation in the purge drum 11. It is convenient to provide separate connections for the pipes 26 and 12 to the reciver but it is obviously not essential, and I do not limit myself to this construction except when specifically recited in the claims.

Various other modifications of detail are possible, and are contemplated.

Under ordinary running condition the valves 10, 14, and 15 are open. When the high pressure gage shows a head pressure materially in excess of that corresponding to the temperature in the liquid header as shown by thermometer 4 valves 10, 14, and 15 are closed. Expansion valve 20 is opened. The resulting chilling by coil 19 will liquefy substantially all the refrigerant gas in purge drum 11 and when this result has been attained gage 16 will come to rest. Valve 14 is then opened to drain the liquefied refrigerant away and is again closed. Valve 18 is opened to vent the confined foreign gases from drum 11 and valve 20 is closed. Thereafter valve 18 is closed and valves 10, 14, and 15 are opened.

What is claimed is:

1. The combination of a liquid refrigerant line; a condenser constructed and arranged to discharge liquefied refrigerant and non-condensable gases into said line; a purge drum in communication with said liquid line below said condenser and arranged to accumulate non-condensable gases by gravity flow from the condenser; refrigerating means in said drum operable to liquefy refrigerant gas there present; valve means operable to isolate said drum from said liquid line, and to return liquid refrigerant from said drum to said line, while maintaining said isolation; and valved means for venting said drum.

2. The combination of a receiver for liquid refrigerant; a condenser for liquefying refrigerant; a liquid line connected to receive liquid refrigerant and non-condensable gases from said condenser and to discharge into said receiver beneath the surface of liquid therein; a purge drum below the bottom of said condenser normally in communication with said liquid line and arranged to accumulate non-condensable gases by gravity flow from said condenser; means operable to isolate said drum from said liquid line; means operable to liquefy refrigerant gas in said drum; a connection operable to discharge liquid refrigerant from said drum into said receiver while maintaining the isolation of said drum; and valve means for venting said drum.

3. The combination of a condenser constructed and arranged to discharge liquefied refrigerant and non-condensable gases; a liquid line fed thereby; a receiver fed by said liquid line and so arranged that liquid refrigerant therein forms a trap sealing against the entrance of gases into the receiver from said liquid line; a purge drum normally in communication with said liquid line to receive gases therefrom; means for isolating said drum from said line; refrigerating means for liquefying refrigerant present in said drum; means including a trap sealed by liquid refrigerant for discharging liquid refrigerant from said drum to said receiver; and means for venting said drum.

In testimony whereof I have signed my name to this specification.

THOMAS SHIPLEY.